Oct. 7, 1969   E. BONAMI   3,470,580
TRIMMING TONGUES
Original Filed Dec. 29, 1966   4 Sheets-Sheet 2

INVENTOR.
ERNEST BONAMI
BY E T McCabe
ATTORNEY

Fig_3

Oct. 7, 1969  E. BONAMI  3,470,580
TRIMMING TONGUES
Original Filed Dec. 29, 1966  4 Sheets-Sheet 4

INVENTOR.
ERNEST BONAMI
BY ET McCabe
ATTORNEY

United States Patent Office 3,470,580
Patented Oct. 7, 1969

3,470,580
TRIMMING TONGUES
Ernest Bonami, Western Springs, Ill., assignor to Swift & Company, Chicago, Ill., a corporation of Illinois
Original application Dec. 29, 1966, Ser. No. 605,794. Divided and this application Nov. 20, 1968, Ser. No. 777,231
Int. Cl. A22b 5/00
U.S. Cl. 17—1  8 Claims

ABSTRACT OF THE DISCLOSURE

Beef tongues are mechanically trimmed while retained against displacement from a generally horizontal position by first cutting transversely to separate the gullet and mouth portions and then moving the latter forwardly while severing a layer of fat from the underside. Apparatus includes terminal delivery and discharge belts with retaining clamp reciprocable therebetween and a cross-rotating fat severing knife. All of the latter being supported for transverse reciprocation relative to a vertical separating knife.

---

This application is a division of my copending application S.N. 605,794 filed Dec. 29, 1966.

The present invention relates to improvements in the art of trimming animal tongues, and more specifically to an improved method and apparatus for removing fatty tissue from the underside of a beef tongue.

Heretofore the trimming of tongues has been undertaken entirely by hand. The tongue is a relatively large organ consisting mainly of an extrinsic muscle mass attaching to the gullet, or throat, of an animal and an intrinsic muscle mass, normally located in the mouth of an animal. At slaughter the entire combined mass is removed from the gullet and mouth of an animal and the two parts are then separated. Present methods of trimming tongues are laborious and time-consuming, requiring a great deal of hand labor. The tongue contains a hinge bone structure, located approximately centrally of the two portions, which is quite difficult to sever. In addition to separating the gullet and mouth portions, the latter, which is more valuable, must be parted from certain fatty tissues.

It is therefore, an object of the present invention to provide an improved method and apparatus for trimming fat from animal tongues.

It is another object of the present invention to provide a method and apparatus for separating the parts and removing fat from tongues in a continuous, rapid operation.

Generally speaking the method of the present invention involves the severing of fatty tissues from the underside of a tongue by causing a free forward end of the tongue to be raised while cutting into the fatty tissue toward the rear end thereof. Preferably the rear end of the tongue is securely held against displacement; and it is further preferred that the gullet portion of the tongue be first removed from the mouth portion upon which the foregoing is then performed.

An apparatus for performing this method comprises a carriage means for supporting the tongue, a lifting means for raising the forward tip of the tongue, and a severing means for cutting the fat from the underside of the tongue. At least one of the carriage means and cutting means is movable respecting the other. Similarly the apparatus preferably includes restraining means associated with the carriage means; and a further cutting means for removing the gullet portion of the tongue.

Further objects and advantages of the present invention will become apparent from the following specification read in conjunction with the drawings in which.

Figure 1:
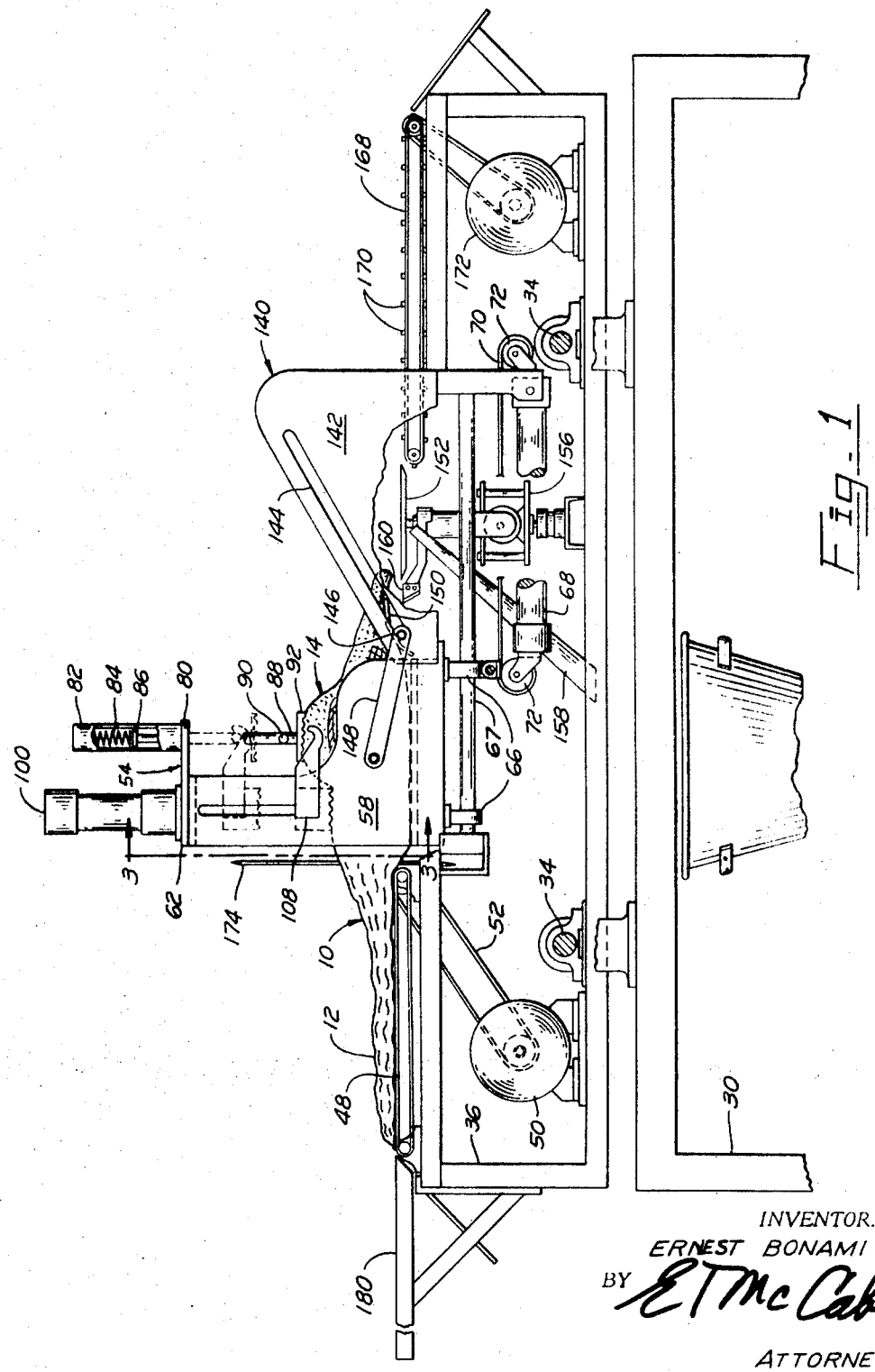
FIGURE 1 is a side elevation of an apparatus capable of carrying out the method of the present invention shown with a tongue in position for trimming.
Figure 5:
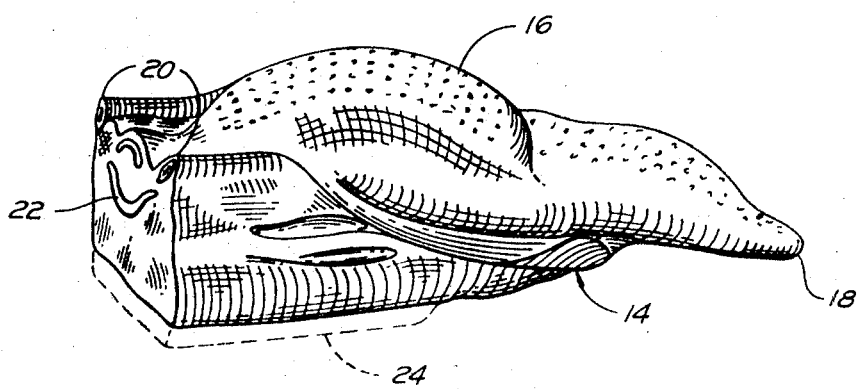
FIGURE 5 is a perspective view of a portion of a tongue trimmed in accordance with the invention.

More specifically, the method of the present invention may be better understood by reference to the illustrations wherein a tongue generally 10 is shown in FIGURES 1 and 5. The tongue comprises a gullet portion 12 and a mouth portion generally 14. The latter, shown in FIGURE 5, possesses an enlarged area or heel 16 and a tip end 18. A hinge bone structure 20 and portion of thyroid cartilage 22 terminate in the tongue. The tongue 10 is placed on a work surface with the mouth portion forwardly. The central portions of the tongue are compressed against the surface and the tongue is separated by cutting vertically and transversely. Then the mouth portion 14 is moved forward. While moving forward, the forward tip 18 of the tongue is raised and carried over a cutting means, which is positioned horizontally to cut parallel to the work surface.

As the tongue is moved forward, the cutting means severs a layer of fatty tissue 24 from a point behind the tip 18 to the end of the mouth portion 14. As the tip end 18 passes beyond the cutting means it is released to return to a horizontal position. When the trimming is completed the compression is released and the trimmed tongue is removed from the vicinity of the cutting means.

The method of the present invention allows for closely following and trimming the depth of the fat on the underside of the tongue 10 by resiliently compressing the heel portion 16 of the tongue toward the work surface. As the tip of the tongue is raised, the entire fatty layer will be biased toward the work surface, resulting in a substantially uniform depth of cut by the cutting means.

The aforementioned separating step, which preferably precedes the trimming of fat, is the removal of the undesirable gullet portion 12 from the tongue. This may be accomplished by retaining the rear of the tongue in contact with the surface and transversely moving the tongue to contact a fixed, vertical cutting member adapted for cutting perpendicular to the major dimension of the tongue.

Figure 2:
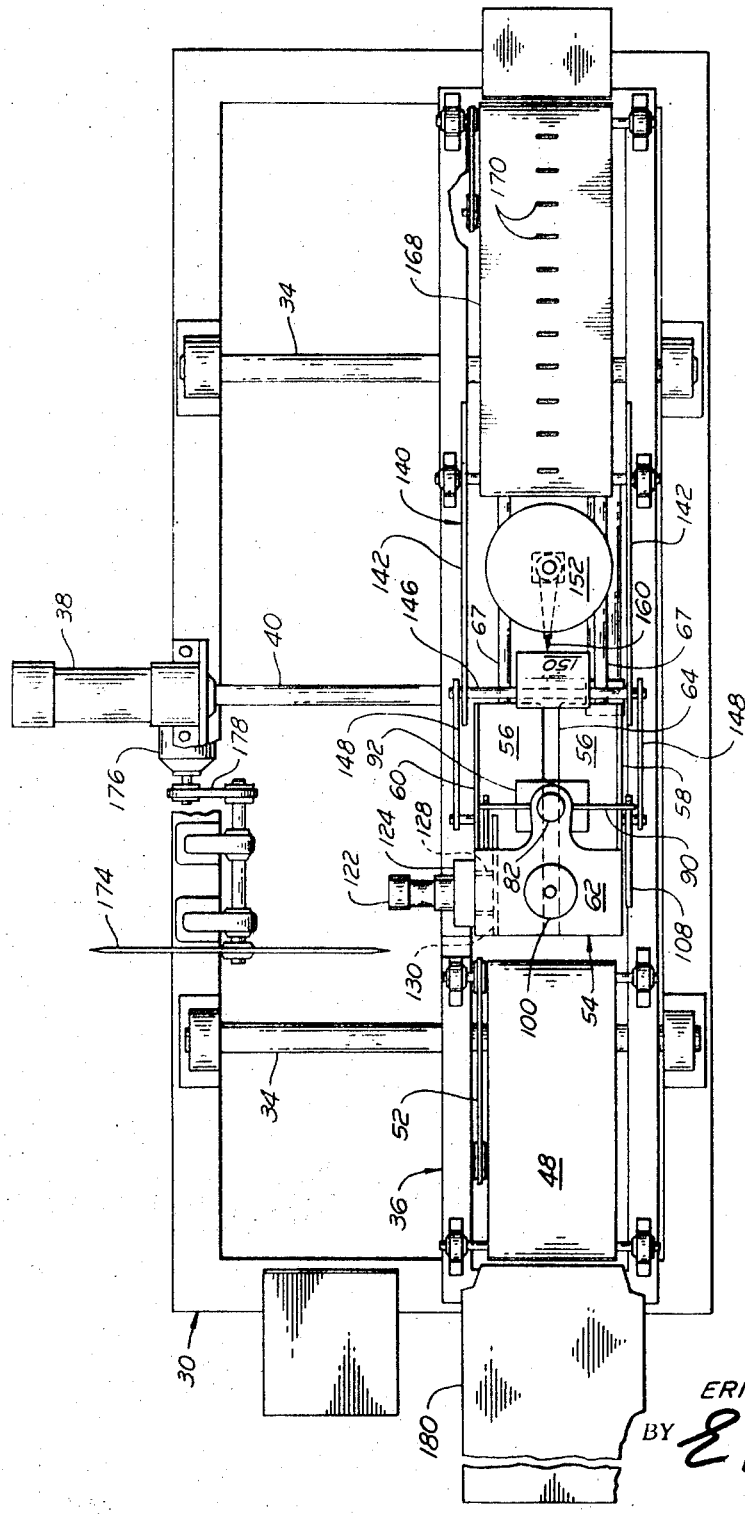
FIGURE 2 is a plan view of the apparatus of FIGURE 4 with the tongue removed.

An apparatus suitable for carrying out the present invention is illustrated in FIGURES 1–4. Referring to FIGURES 1 and 2, the apparatus has a frame 30 having a pair of spaced, transverse bars 34 mounted thereon. Slidably mounted for transverse reciprocation on the bars 34 is a carriage generally 36 of box frame configuration. As shown in FIGURE 2, the carriage 36 is reciprocated by a hydraulic or air cylinder 38 connected to the carriage 36 by a rod 40. The carriage generally 36 may be reciprocated along bars 34 a distance approximately equal to its width.

Mounted on the rear end of the carriage 36 (to the left in the figures) is an endless belt conveyor 48, which can be halted, or driven in either forward or rearward directions by a reversible electric motor 50 connected through a belt 52. In spaced relation in front of the conveyor 48 is a tongue retaining means generally 54, having a flat floor 56, two spaced, parallel, longitudinal side walls 58, 60 and a top 62 which is mounted atop the side walls 58, 60 above and parallel to the floor 56. As shown in FIGURE 2, the top 62 is longitudinally shorter than the floor 56 and is located at the rear of the assembly 54. The floor 56 is bifurcated to provide a slot 64 extending longitudinally rearward from the front edge.

The retaining means 54 is mounted on bearings 66 slidably supported on a pair of parallel, longitudinal rails 67. Rails 67 in turn are fixedly mounted on the carriage generally 36. The retaining means 54 may be longitudinally reciprocated along the rails 67 by suitable means such as cable cylinder 68 attached to certain of the bearings 66 by a cable 70 trained about pulleys 72. A piston (not shown) within the cylinder is forced from one end thereof to the other, by compressed air, under control of an operator. Opposite ends of the cable 70 are attached to opposite faces of the piston, and thus, the bearings 66 and retaining means 54 will be reciprocated.

Extending forwardly of the top 62 of the retaining means generally 54 between the walls 58, 60 is a projecting bracket 80, upon which is mounted a resilient means comprised of a cylinder 82 containing a spring 84 and a piston 86, as shown in the cutway in FIGURE 1. The spring presses downwardly on the piston 86, and the rod 88 which projects downwardly therefrom. Attached near the bottom of the rod 88 is a transverse, horizontal lifting bar 90. Attached to the bottom of the rod 88 below bar 90 is a compression plate 92, which is oriented to be forced against the heel 16 of a tongue 10.

Figure 3:
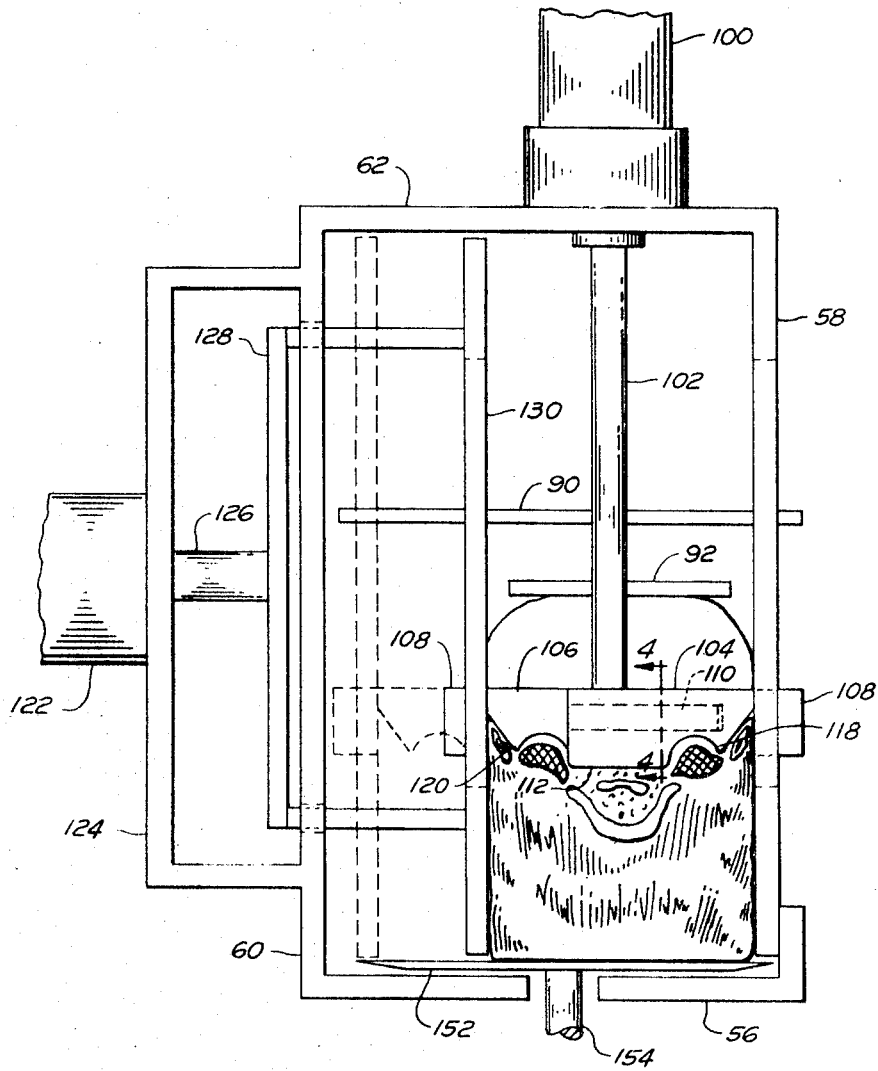
FIGURE 3 is a partial view, showing a view of tongue retaining assembly, taken along line 3—3 of FIGURE 1.
Figure 4:
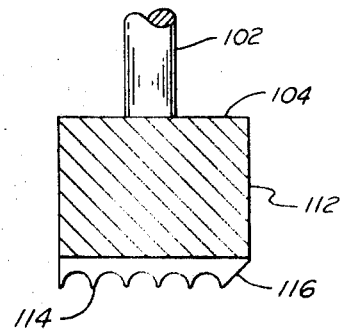
FIGURE 4 is a partial detail view in section taken at line 4—4 of FIGURE 3.

The detail of the retaining means is best appreciated by reference to FIGURES 1 and 3. Mounted on the top 62 of the retaining means 54 is a tongue restraining means comprising a hydraulic cylinder 100 having a rod 102 projecting downwardly therefrom. Attached to the bottom of the rod 102 is a fixed block 104 extending to wall 58. An extendable block 106 is reciprocably connected to the fixed block 104 by a slide 110. Tines 108 reach forwardly from the outer ends of each block 104, 106 and form cradles to receive the ends of the lifting bar 90. The fixed block 104 comprises a rectangular central body 112 having transverse serrations 114 (shown in FIGURE 4) and a beveled forward edge 116 to correspond to the heel 16 of the tongue 10. The outer extremity of block 104 is contoured at 118 to correspond to the hinge bone 20 and adjacent musculature of the tongue. Similarly, the extendable block 106 is contoured at 120. This configuration of the blocks 104, 106 has been found very effective in holding a tongue steady while separating the gullet 12 and mouth 14 portions.

Attached to the back side 60 of the retaining assembly 54 is a horizontal hydraulic cylinder 122 mounted on a bracket 124. A shaft 126 extends through the bracket to a yoke 128 which, in turn, extends through horizontal slots in the wall 60 of the retaining means 54. A compression plate 130, roughly corresponding to the shape of the wall 60, is supported on the yoke 128 and can be forced against the side of a tongue held in the retaining means. Both the compression plate 130 and retaining means wall 58 contain vertical slots through which the outer ends of blocks 104, 106 extend. Tines 108 are positioned outside plate 130 and wall 58; and the extendable block 106 will be thus moved by the reciprocation of plate 130 so as to conform to the size of tongue being operated upon. Also it is to be noted in FIGURE 3 that both wall 58 and plate 130 are vertically spaced above the floor 56 to allow passage of a knife hereinafter described.

Referring again to FIGURE 1 and 2, mounted on top of the carriage 36 directly in front of the retaining means 54, is a tongue tip lifting means assembly generally 140. The tongue tip lifting means 140 comprises a pair of parallel, longitudinally oriented uprights 142 fixed to the outer members of frame 36, spaced apart a distance greater than that distance between the outside retaining means walls 58, 60, and aligned to permit passage of the retaining means generally 54 therebetween. The uprights 142 each have aligned, inclined slots 144 with the lower ends thereof at the rear of the upright on a level approximately even with the floor 56 of the retaining means 54.

A transverse, horizontal bar 146 is slidably mounted in the slots 144, and has ends projecting beyond the uprights 142. Attached to the bar 146 just outside uprights 142 are the forward ends of a pair of arms 148. The rear ends of the arms 148 are journalled in the rear portions of the retaining means walls 58, 60. Mounted on top of the transverse bar 146 is a flat, guide plate 150, oriented with a slight forward incline.

Mounted for rotation on the carriage 36 between the uprights 142 is a horizontal, circular cutting knife 152, driven by a motor, not shown, through a shaft 154. The level of the knife 152 is adjustable, by elevator mechanism 156, to several positions above the level of the retainer means floor 56. The shaft 154 is longitudinally aligned with the slot in the floor 56. A discharge chute 158 for trimmings is mounted under the rear portion of the knife 152, sloping downwardly and rearwardly, and a plow blade 160 is positioned just beneath and behind the edge of knife 152 to split the layer of fat just prior to its being severed so as to divide and pass to the sides of knife shaft 154.

An endless belt discharge conveyor 168, is mounted on top of the carriage 36, with the rear end just beyond the knife 152, and the front end terminating at the right end of the carriage 36 (as viewed in FIGURES 1 and 2). A plurality of short transverse cleats 170 are spaced centrally throughout the conveyor. The conveyor 168 is powered by an electric motor 172 mounted on the carriage 36. When the tongue tip 18 falls from the lifting means 140 it will be supported and drawn forward by this conveyor.

Mounted on the frame 30 is a transversely and vertically disposed circular cutting knife 174, positioned to penetrate the space between the feed-in conveyor 48 and the retaining means generally 54 when the carriage 36 is transversely reciprocated along the bars 34. The knife 174 is driven by an electric motor 176 through a belt 178.

In operation, the tongue trimming procedure is begun with the apparatus in the position shown in the drawings. A complete tongue, including mouth portion 14 and gullet portion 12, is fed tip first from a suitable table 180 or conveyor located behind the conveyor 48 onto the latter and through the tongue retaining assembly 54 until the tip 18 of the tongue slides over the tongue tip guide plate 150. At this point, the conveyor 48 is stopped. The hydraulic cylinder 100 atop the retaining assembly 54 is activated to move the block 104 downward to engage the midsection of the tongue. At the same time, the tongue compression plate 92 moves downward a corresponding lower position against the tongue heel 16. As block 104 contacts the tongue, the tines 108 disengage from the horizontal bar 90, and plate 92 is pressed upon the tongue heel by the resilient spring 84.

Simultaneous with the activation of the hydraulic cylinder 100 atop the retaining means generally 34, the hydraulic cylinder 122 on the side 60 is also activated, causing horizontal movement of the compression plate 130 to a position forcing the tongue against the opposite side wall 58, as shown in FIGURE 3. With the tongue thus positioned by the block 104 (and 106) and the plates 92, 130, the motor 176 is started causing rotation of the vertical cutting knife 174. The hydraulic cylinder 38 is then activated, causing transverse movement of the carriage 36 along the transverse bars 34. As the carriage 36 moves, the knife 174 penetrates the sapce between the conveyor 48 and the retaining means 54, separating the gullet portion 12 from the tongue. After the separation is complete, the conveyor 48 is moved rearwardly discharging the gullet portion 12 into a suitable receptacle. The hydraulic cylinder 38 is then reversed to return the carriage 36 to its original position. Now that the gullet portion 12 has been removed from the tongue, the apparatus is ready to perform the trimming operation on the mouth portion generally 14.

To trim the tongue, the horizontal knife 152 is started and compressed air is delivered to the cable cylinder 68 to move the retaining means 54 forwardly. As the retaining means moves forward, between uprights 142, the arms 148 push the bar 146 and guide plate 150 upwardly along slots 144 whereby the forward tip 18 of the tongue is lifted over the knife 152. As the tongue is carried forward by the retaining means 54, a layer of fat 24 is split and sliced from the underside by the plow knife 160 and horizontal knife 152, respectively. The fat is dropped down the discharge chute 158 into a suitable collecting device.

After the retaining means 54 has travelled a distance sufficient to permit the knife 152 to cut the fat from the rear parts of the tongue portion 14, the hydraulic cylinders 100 and 122 on the retaining assembly 54 are reversed to withdraw the block 104 and the compression plate 92 from contact with the top of the tongue, and release the compression plate 130 from contact with the side thereof.

Simultaneous with the release of the block 104 and the plates 92, 130, the rotation of the cutting knife 152 is halted and the forward movement of the retaining assembly 54 is arrested by stopping their respective electric motors. At this point a large amount of the tongue will be supported on conveyor 168 which continues to move forwardly. Thus the tongue portion 14 will be drawn forwardly and discharged from the apparatus.

Obviously, many modifications and variations of the invention as hereinbefore set forth may be made without departing from the spirit and scope thereof, and therefore only such limitations should be imposed as are indicated in the appended claims.

I claim:

1. An apparatus for trimming fat from the underside of an animal tongue, said apparatus comprising: retaining means for supporting a tongue with the underside of said tongue disposed downwardly; lifting means for gradually raising the tip end of said tongue; and severing means for cutting the fatty tissue from beneath said tongue, one of said severing means and retaining means being movable with respect to the other.

2. The apparatus of claim 1 including restraining means to hold the rear of said tongue on said retaining means.

3. The apparatus of claim 2 including resilient means pressing downwardly on an intermediate portion of said tongue.

4. The apparatus of claim 1 including means to move said retaining means longitudinally.

5. The apparatus of claim 4 wherein the lifting means is connected to the retaining means and is moved upwardly when the latter is moved forwardly.

6. The apparatus of claim 1 including cutting means for separating the gullet portion of a tongue from the mouth portion at a location to the rear of said retaining means wherein the mouth portion is supported.

7. An apparatus for trimming fat from the underside of an animal tongue, said apparatus comprising: a frame, a carriage mounted for transverse movement upon said frame; a tongue retaining means recipcrocably mounted on said carriage for longitudinal movement thereon; a lifting plate pivotally connected to said retaining means and extending forwardly thereof; uprights fixed to said carriage forwardly of said retaining means; said uprights being spaced to receive said retaining means therebetween, and having inclined slots for guiding said lifting plate upwardly as said retaining means is moved forwardly; and a horizontally rotating knife on said carriage positioned in the path of said retaining means, said knife positioned to sever fat from the underside of a tongue held in said retaining means as the tip thereof is lifted by said plate.

8. The apparatus of claim 7 including a vertically rotating knife supported on said frame adjacent said carriage for cutting the gullet from said tongue to the rear of said retaining means.

References Cited

UNITED STATES PATENTS

| | | | |
|---|---|---|---|
| 2,590,747 | 3/1952 | Birdseye | 146—130 |
| 2,738,545 | 3/1956 | Stevenson et al. | 17—2 XR |
| 3,075,236 | 1/1963 | Mann et al. | 17—1 |

LUCIE H. LAUDENSLAGER, Primary Examiner

U.S. Cl. X.R.

17—45; 146—105